United States Patent
Gupta et al.

(10) Patent No.: US 9,378,150 B2
(45) Date of Patent: Jun. 28, 2016

(54) MEMORY MANAGEMENT UNIT WITH PREFETCH ABILITY

(75) Inventors: Rohit K. Gupta, Santa Clara, CA (US); Manu Gulati, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 953 days.

(21) Appl. No.: 13/406,905

(22) Filed: Feb. 28, 2012

(65) Prior Publication Data

US 2013/0227245 A1   Aug. 29, 2013

(51) Int. Cl.
*G06F 12/10*   (2006.01)

(52) U.S. Cl.
CPC ...... *G06F 12/1027* (2013.01); *G06F 2212/654* (2013.01)

(58) Field of Classification Search
CPC . G06F 12/1027; G06F 12/10; G06F 12/1009; G06F 12/1036; G06F 12/08; G06F 12/145; G06F 12/0862; G06F 12/1081; G06F 12/1475; G06F 12/1483; G06F 12/0215; G06F 12/0292; G06F 12/0817; G06F 12/082; G06F 12/1072; G06F 2212/654; G06F 2212/6028; G06F 2212/651; G06F 2212/1016; G06F 2212/6026; G06F 2212/656; G06F 2212/684; G06F 9/30047; G06F 9/38; G06F 9/383; G06F 9/466; G06F 9/3017; G06F 9/3802; G06F 9/3834; G06F 11/073
USPC .................. 711/E12.061, 207, 206, E12.059, 711/E12.058, 137, 205, E12.057, E12.004, 711/202
See application file for complete search history.

(56) References Cited

U.S. PATENT DOCUMENTS

| | | | |
|---|---|---|---|
| 5,815,674 A * | 9/1998 | LaBerge | G06F 13/362 710/107 |
| 5,913,923 A | 6/1999 | Dunlap et al. | |
| 5,918,251 A * | 6/1999 | Yamada | G06F 12/1036 710/13 |
| 7,188,229 B2 | 3/2007 | Lowe | |
| 7,415,034 B2 * | 8/2008 | Muller et al. | 370/463 |
| 7,480,784 B2 | 1/2009 | Hummel et al. | |
| 7,984,263 B2 | 7/2011 | Sathaye et al. | |
| 8,639,871 B2 * | 1/2014 | Borchers et al. | 711/103 |
| 2006/0271760 A1 * | 11/2006 | Nicolai | G06F 12/1036 711/207 |
| 2008/0162866 A1 * | 7/2008 | Siddiqi | G06F 9/45537 711/173 |
| 2008/0209130 A1 * | 8/2008 | Kegel et al. | 711/135 |

(Continued)

*Primary Examiner* — Mark Giardino, Jr.
*Assistant Examiner* — Edward Waddy, Jr.
(74) *Attorney, Agent, or Firm* — Meyertons, Hood, Kivlin, Kowert & Goetzel, P.C.

(57) ABSTRACT

Techniques are disclosed relating to integrated circuits that implement a virtual memory. In one embodiment, an integrated circuit is disclosed that includes a translation lookaside buffer configured to store non-prefetched translations and a translation table configured to store prefetched translations. In such an embodiment, the translation lookaside buffer and the translation table share table walk circuitry. In some embodiments, the table walk circuitry is configured to store a translation in the translation table in response to a prefetch request and without updating the translation lookaside buffer. In some embodiments, the translation lookaside buffer, the translation table, and table walk circuitry are included within a memory management unit configured to service memory requests received from a plurality of client circuits via a plurality of direct memory access (DMA) channels.

23 Claims, 5 Drawing Sheets

(56) References Cited

U.S. PATENT DOCUMENTS

| | | | |
|---|---|---|---|
| 2010/0250853 A1* | 9/2010 | Krieger et al. | 711/122 |
| 2011/0010521 A1* | 1/2011 | Wang ................. G06F 12/1027 | 711/207 |
| 2011/0023027 A1 | 1/2011 | Kegel et al. | |
| 2011/0087858 A1* | 4/2011 | Persson ............... G06F 12/1027 | 711/206 |
| 2011/0276760 A1 | 11/2011 | Chou | |
| 2012/0226888 A1* | 9/2012 | Rychlik .............. G06F 12/1027 | 711/207 |
| 2013/0007405 A1* | 1/2013 | Caskey ................ G06F 17/289 | 711/206 |
| 2013/0138847 A1* | 5/2013 | Lai ........................ G06F 13/423 | 710/110 |

* cited by examiner

MEMORY MANAGEMENT UNIT WITH PREFETCH ABILITY

BACKGROUND

1. Technical Field

This disclosure relates generally to integrated circuits, and, more specifically, to implementing virtual memory systems.

2. Description of the Related Art

To maximize the size of addressable memory space, modern computer systems often implement a virtual memory system in which a portion of the addressable space corresponds to memory locations in faster primary storage (e.g., random access memory (RAM)) and the remain portion corresponds to slower, but larger secondary storage (e.g., hard drives). As data is requested, it is moved from secondary storage into primary storage, where it can be accessed more quickly. When the data is no longer needed, it is written back to secondary storage.

In order to track where data is currently located, memory requests (i.e., requests to read data or write data) are addressed to virtual addresses that are subsequently mapped (i.e., translated) to corresponding physical addresses in memory. These translations are typically performed at a memory management unit (MMU), which accesses a master table of translations in memory (called a "page table") and stores a subset of translations in a localized buffer (called a "translation lookaside buffer (TLB)"). Accordingly, if a particular virtual address does not have a translation in the TLB (i.e., it is said to "miss" the TLB), the MMU may include a table walk unit that attempts to retrieve the translation from the page table in main memory and to load the translation into the TLB.

If the table walk unit is unable to find a translation for a particular virtual address in the page table, this generally means that the memory request is addressed to a location corresponding to secondary storage, rather than primary storage. In this event, the table walk unit notifies the operating system via a "page fault" indication. The operating system, in turn, reads the requested data from secondary storage and loads it into primary storage to make it accessible (when data is moved, it is typically moved as a block of multiple bytes called a "page"). The operating system also inserts a set of corresponding translations into the page table. As memory requests are subsequently received that are addressed to ones of these virtual addresses, a portion of these translations may eventually be loaded into the TLB by the MMU. In some instances (such as when the TLB is full), loading a new translation into the TLB may result in an older translation being evicted from the TLB.

SUMMARY

The present disclosure describes embodiments of a memory management unit that is configured to prefetch virtual address translations from memory. In various embodiments, the memory management unit is configured to load translations in response to a request (rather than in response to a TLB miss). In many instances, prefetching translations can reduce the latency for accessing memory as prefetched translations are already loaded when memory requests that use the translations are subsequently received (as opposed to waiting while table walk circuitry retrieves translations from memory).

In some embodiments, the memory management unit is configured to store translations resultant from TLB misses in a TLB and translations loaded in response to requests in a separate translation table from the TLB. In one embodiment, both types of translations may be retrieved from memory using shared circuitry. This configuration prevents the TLB from becoming polluted with requested translations, and may thus reduce the possibility of translations being repeatedly evicted and reloaded (although all embodiments need not address either or both of these issues).

Figure 1:
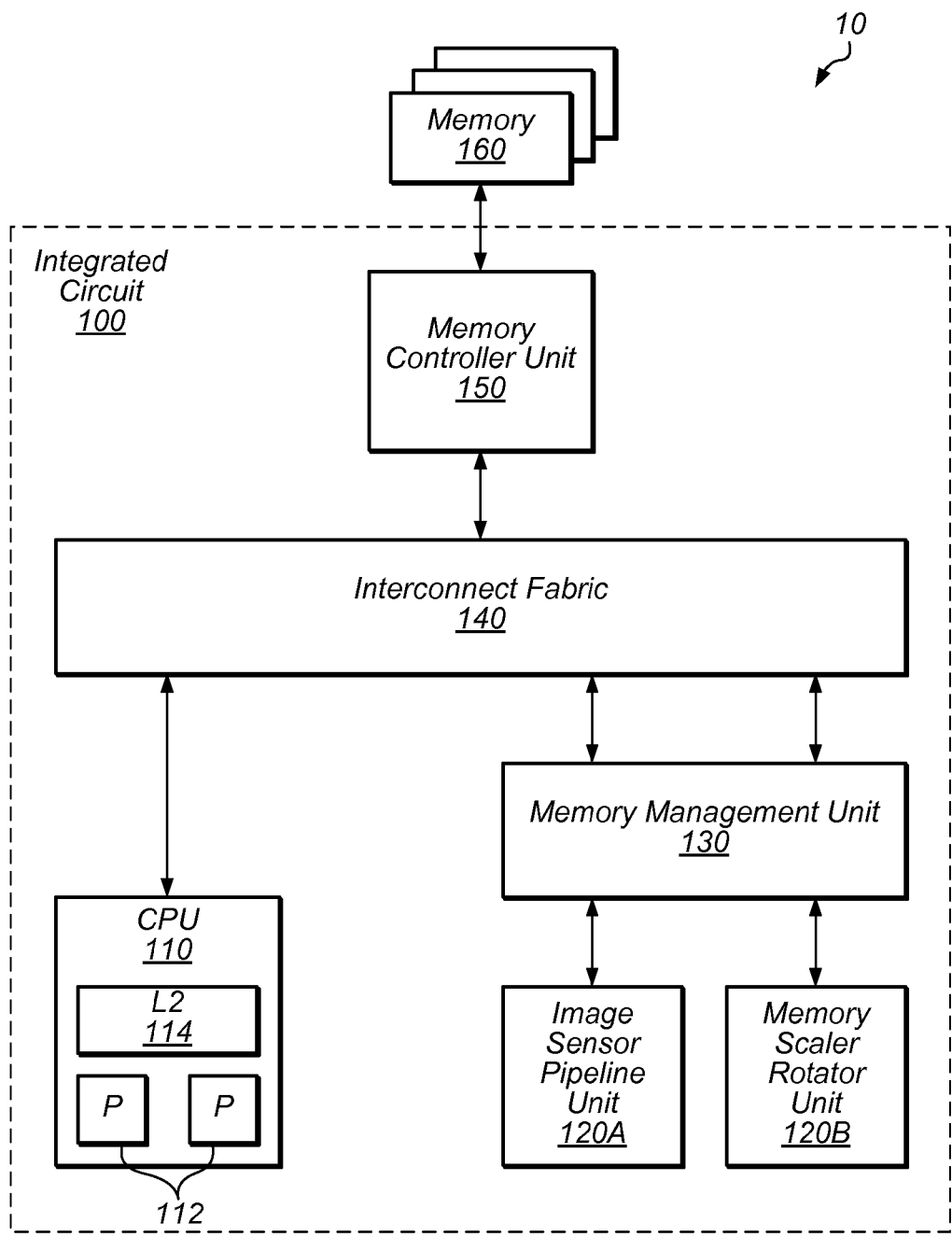
FIG. 1 is a block diagram illustrating one embodiment of a system configured to implement a virtual memory.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing cores, the terms "first" and "second" processing cores can be used to refer to any two of the eight processing cores. In other words, the "first" and "second" processing cores are not limited to logical processing cores 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Turning now to FIG. 1, a block diagram of a system 10 is shown. As will be discussed below, system 10 is one embodiment of a system that is configured to implement a virtual memory and that includes a memory management unit configured to prefetch virtual address translations from memory. As used herein, the term "prefetch" refers to the loading of translations for virtual addresses into a localized buffer of the memory management unit before the translations are needed to translate the virtual addresses. In the illustrated embodiment, system 10 includes an integrated circuit (IC) 100 coupled to one or more external memory modules 160. Integrated circuit 100 includes a central processor unit (CPU) 110, which includes one or more processors 112 and a level 2 (L2) cache 114. Integrated circuit 100 further includes an image sensor pipeline (ISP) unit 120A and a memory scaler rotator (MSR) unit 120B, which are coupled to a memory management unit (MMU) 130. CPU 110 and MMU 130 are coupled together via interconnect fabric 140, which, in turn, is coupled to a memory controller unit 150.

CPU 110, in one embodiment, is configured to execute instructions of an operating system stored in memory 160 to facilitate implementation of a virtual memory. Accordingly, the operating system may maintain one or more levels of pages tables in memory 160 that include translations for virtual addresses to corresponding physical addresses in memory 160. The operating system may also be invoked by CPU 110 to service any pages faults in which the operating system may retrieve one or more pages from a secondary storage (not shown) and load the pages into memory 160. The operating system may correspondingly update page tables to include translations for the newly added pages and may remove translations for any pages written back to secondary storage.

CPU 110 may implement any instruction set architecture, and may be configured to execute instructions defined in that instruction set architecture. CPU 110 may employ any microarchitecture, including scalar, superscalar, pipelined, superpipelined, out of order, in order, speculative, non-speculative, etc., or combinations thereof. CPU 110 may include circuitry to implement microcoding techniques. Processors 112 may include one or more level-1 (L1) caches, and thus the cache 114 is an L2 cache. However, in other embodiments, CPU 110 may include more (or less) levels of caches. Caches such as cache 114 may employ any size and any configuration (set associative, direct mapped, etc.).

Image sensor pipeline (ISP) unit 120A and memory scaler rotator (MSR) unit 120B are one embodiment of various clients configured to generate memory requests to read and write data to memory 160. (As such, units 120A and 120B may be referred to herein as clients 120.) In one embodiment, ISP unit 120 is configured to receive image data from a peripheral device (e.g., a camera device), and to the process the data into a form that is usable by system 10. In one embodiment, MSR unit 120B is configured to perform various image-manipulation operations such as horizontal and vertical scaling, image rotating, color space conversion, dithering, etc. In the illustrated embodiment, clients 120 send memory requests to memory management unit 130, where the virtual addresses specified in the requests are translated to their corresponding physical addresses, and the requests are forwarded on to memory controller unit 150.

Due to the particular operations performed by clients 120 in various embodiments, clients 120 may access memory in a manner that is not conducive to using a translation lookaside buffer (TLB). That is, clients 120 may not perform repeated memory accesses to the same addresses (which reduces the benefit of caching translations in a TLB) and may perform a large number of memory accesses to different addresses (which may result in several TLB evictions). For example, MSR unit 120 may perform several memory accesses to perform a single rotation operation on an image as it reads several lines of pixels from memory. Still further, MSR unit 120 may read a particular memory location only once during the rotation operation. While clients 120, in some embodiments, may have problematic access patterns for using a TLB, their access patterns may be predictable in may instances. For example, since a rotation operation has a predictable access pattern, it is possible to predict the next set of pixels that need to be read from memory based on the previous set of pixels read from memory.

As will be described below, in some embodiments, a client 120 may include circuitry configured to determine a set of virtual addresses to be used by that client 120 (i.e., to be specified in memory requests of that client 120), and to send prefetch requests to memory management unit 130 to cause unit 130 to load translations for virtual addresses into a translation table. The client 120 may then send memory requests addressed to those virtual addresses, which are subsequently translated using the prefetched translations. In various embodiments, clients 120 may also be configured to send "normal" memory requests (i.e., those addressed to virtual addresses that do not have prefetched translations). As discussed above, using prefetched translations can reduce memory access latencies since the translations do not need to be fetched after a TLB miss. Clients 120 are described in further detail below with respect to FIG. 3.

Memory management unit (MMU) 130, in one embodiment, is configured to receive memory requests from clients 120, and to translate the virtual addresses specified in those requests to corresponding physical addresses usable by memory controller unit 150. In various embodiments, MMU 130 may include a table walk unit configured to retrieve translations from one or more page tables in memory 160 for localized storage in MMU 130. When a particular translation is not available in the page tables, MMU 130 may also be configured to signal a page fault to an operating system (e.g., executing on CPU 110) to service the fault. In the illustrated embodiment, MMU 130 is configured to receive memory requests from multiple clients 120. In some embodiments, MMU 130 may also be configured to receive memory requests via multiple direct memory access (DMA) channels (which may include separate write and read channels), and to process ones of the requests concurrently (i.e., in parallel).

As noted above, in various embodiments, MMU 130 is configured to prefetch translations in response to requests from clients 120, and store the translations locally to facilitate the translation of virtual addresses in subsequently received memory requests. In some embodiments, MMU 130 is configured to store non-prefetched translations and prefetched translations in separate respective translation tables. Accordingly, in one embodiment, when a memory request associated with a non-prefetched translation is received, MMU 130 translates the virtual address for the memory request using a translation in the TLB if one is present. If the request misses the TLB, a table walk unit may be used to retrieve the translation from memory and process the request. In one embodiment, when a memory request is associated with a prefetched translation, MMU 150 translates the virtual address for the memory request using a translation in the separate translation table. In both instances, the processed requests may be sent on to memory controller unit 150 after translation. In some embodiments, MMU 130 is configured to receive memory requests associated with non-prefetched translations and memory requests associated with prefetch translations via separate respective interfaces. In such an embodiment, MMU 130 may be configured to distinguish between memory requests associated with non-prefetched translations and memory requests associated with prefetched translations based the interfaces that received the requests, and to process the requests accordingly. MMU 130 is described in further detail below with respect to FIG. 3.

Interconnect fabric 140, in one embodiment, is configured to facilitate communications between units 110-160. Interconnect fabric 140 may include any suitable interconnect circuitry such as meshes, network on a chip fabrics, shared buses, point-to-point interconnects, etc.

Memory controller unit 150, in one embodiment, is configured to receive translated memory requests from CPU 110 or MMU 130 and to implement a memory PHY that handles the low-level physical interfacing with memory 160. For example, memory controller unit 150 may be responsible for the timing of the signals, for proper clocking to synchronous DRAM memory, etc. In one embodiment, memory controller unit 150 may be configured to lock to a clock supplied within the integrated circuit 100 and may be configured to generate a clock used by the memory 160.

Memory 160 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 100 in a chip-on-chip configuration, a package-on-package configuration, or a multi-chip module configuration.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
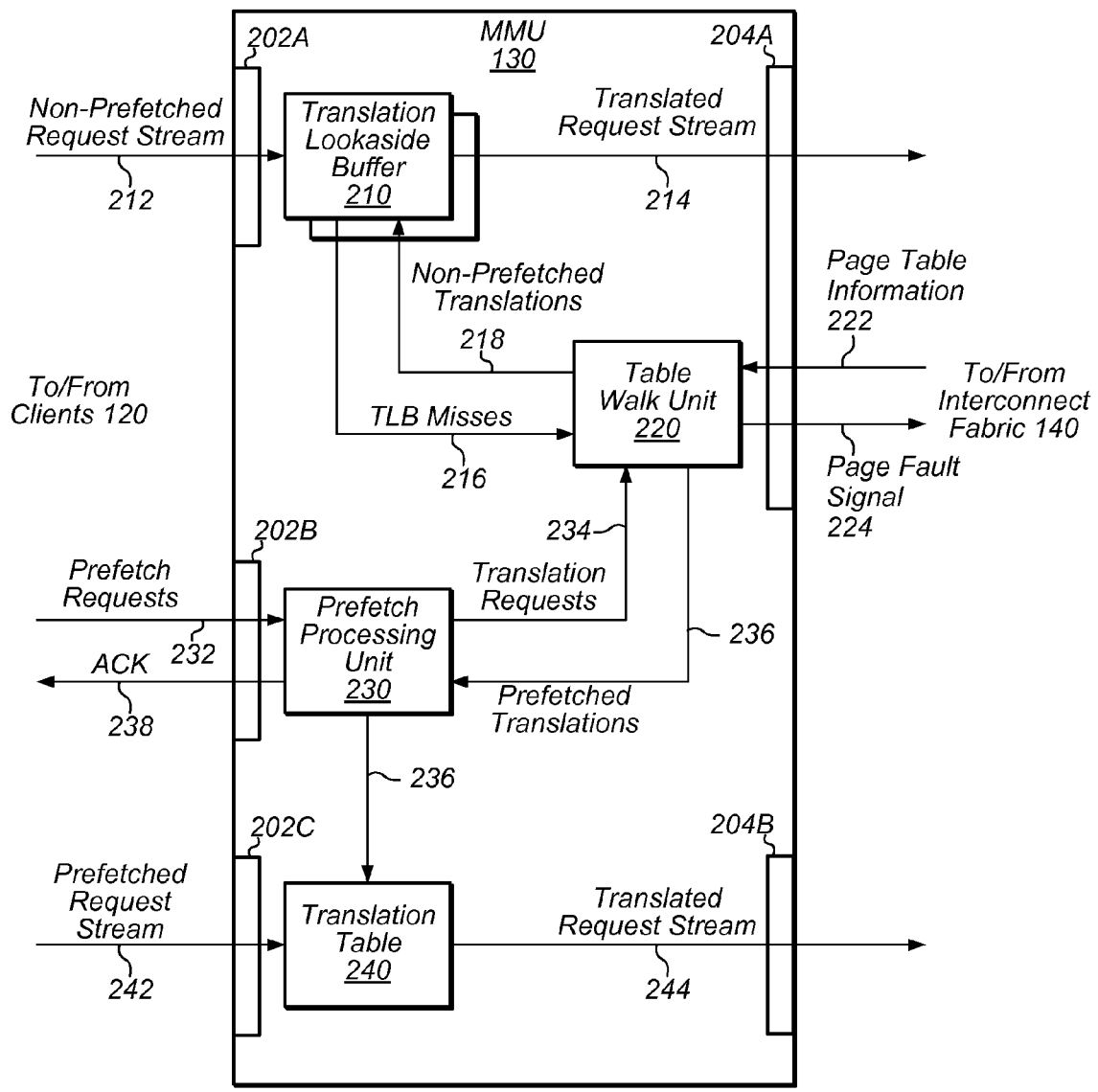
FIG. 2 is a block diagram illustrating one embodiment of a memory management unit of the system.

Turning now to FIG. 2, one embodiment of MMU 130 is depicted. As shown, MMU 130 includes a translation lookaside buffer (TLB) 210, table walk unit 220, prefetch processing unit 230, and translation table 240.

In the illustrated embodiment, MMU 130 is configured to communicate with clients 120 via three distinct interfaces 202A-C and with fabric 140 via two distinct interfaces 204A and 204B. In other embodiments, MMU 130 may include more (or less) interfaces 202 and/or 204 than shown—for example, in one embodiment, TLB 210 and table walk unit 220 may have separate interfaces 204 rather a shared interface 204A. In one embodiment, each interface 202 is configured to communicate with multiples ones of clients 120 and via multiple DMA channels. Similarly, in one embodiment, each interface 204 may be configured to communicate with multiple entities (e.g., CPU 110 and memory controller 150) and via multiple DMA channels. Being distinct, interfaces 202 and 204 may also be configured to communicate independently of and concurrently with one another.

TLB 210, in one embodiment, is configured to store non-prefetched translations 218 for memory requests received via interface 202A as non-prefetched request stream 212. In the event that TLB 210 already has a translation for a received request (due to a previous TLB miss), TLB 210 may be configured to translate the virtual address of that request and to forward the request on to memory controller unit 150 via interface 204A as translated request stream 214. On the other hand, if TLB 210 does not include a particular translation for a received memory request, TLB 210 may indicate the TLB miss 216 to table walk unit 220 and subsequently receive a non-prefetched translation 218 to translate the virtual address of that memory request. TLB 210 may store translations in any suitable manner. In the illustrated embodiment, TLB 210 is depicted as multiple-level TLB in which each level stores a respective of portion of a physical address for a given translation. However, in other embodiments, TLB 210 may include only a single level. TLB 210 may also be set associative, direct mapped, etc.

Table walk unit 220, in one embodiment, is configured to provide non-predicted translations 218 to TLB 210 in response to TLB misses 216 and prefetched translations 236 to translation table 240 in response to translation requests 234. Table walk unit 220 may retrieve translations 218 and 236 from page table information 222 stored in one or more page tables in memory 160. In the event, table walk unit 220 is unable to find a particular translation in memory 160, table walk unit 220 may provide a page fault signal 224 to notify the operating system via an interrupt. In some embodiments, table walk unit 220 is further configured to give priority to requests 234 for prefetched translations 236 over servicing requests caused by TLB misses 216.

Prefetch processing unit 230, in one embodiment, is configured to receive prefetch requests 232 from clients 120 via interface 202B and to generate corresponding translation requests 234 for table walk unit 220. In some embodiments, a given prefetch request 232 may specify a single virtual address for which a translation is to be prefetched. In one embodiment, prefetch processing unit 230 may, in turn, generate a corresponding request 234 to load the translation for that address. However, in another embodiment, prefetch processing unit 230 may generate requests 234 for each address in that address's page. In some embodiments, a given request 232 may specify multiple virtual addresses; prefetch processing unit 230 may, in turn, generate multiple requests 234. In other embodiments, a given request 232 may specify a base address of an initial page and a number indicative of a set of pages after the initial page; prefetch processing unit 230 may then determine a set of corresponding translations to be fetched and generate requests 234. In the illustrated embodiment, prefetch processing unit 230 is further configured to send an acknowledgement (ACK) 238 back to a client 120 once its requested translations are prefetched and stored in translation table 240. As will be discussed with respect to FIG. 3, in various embodiments, a client 120 may be configured to not send a request associated with a prefetched translation unless it has received an acknowledgment 238 that the translation is available for use. In other words, clients 120 may be configured to prevent sending requests that would miss table 240.

Translation table 240, in one embodiment, is configured to store prefetched translations 236 for memory requests received via interface 202C as prefetched request stream 242, and to translate and forward the requests via interface 204B as translated request stream 244. Translation table 240 may be configured to store translations in any suitable manner. According, in some embodiments, table 240 may include a single level that stores an entire physical address for a given virtual address; in other embodiments, table 240 may include multiple levels that each includes a portion of a physical address for a given virtual address. In some embodiments, table 240 may include separate respective banks for translations associated with write requests and for translations associated with read requests. In some embodiments, translations in table 240 may be arranged based on virtual and/or physical address, the particular client 120 that requested the translation, the particular DMA channel over which a request 232 was received, etc. For example, in one embodiment, translations for prefetch requests received via a first DMA channel may be stored in a first portion and translations for prefetch requests received via a second DMA channel may be stored a second portion.

Figure 3:
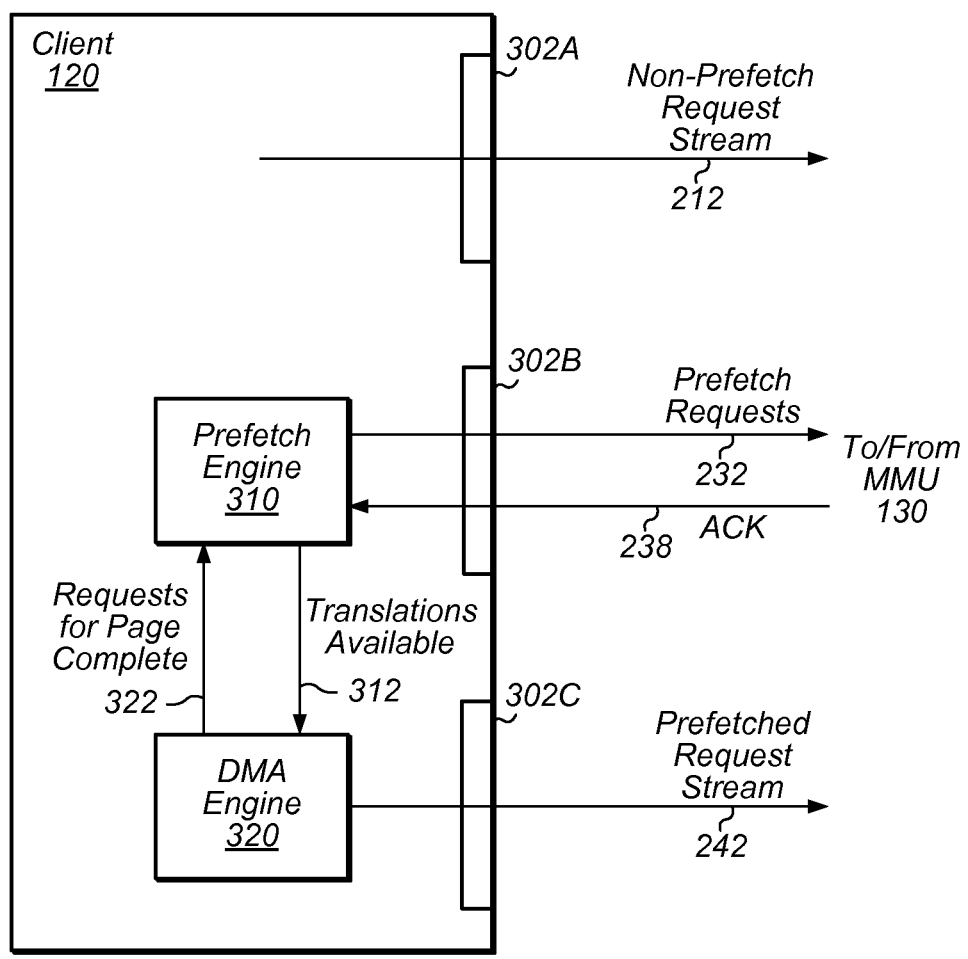
FIG. 3 is a block diagram illustrating one embodiment of a client configured to generate memory requests to the memory management unit.

Turning now to FIG. 3, one embodiment of a client 120 is depicted. As shown, client 120 includes a prefetch engine 310 and a DMA engine 320.

In the illustrated embodiment, client 120 includes three distinct interfaces 302A-C for communicating with MMU 130. As with interfaces 202-204, in some embodiments, client 120 may include more (or less) interfaces 302; in some embodiments, interfaces 302 may be configured to communicate via multiple DMA channels, and in parallel with one another.

Prefetch engine 310, in one embodiment, is configured to determine a set of virtual addresses to used by client 120 and issue corresponding prefetch requests 232 for those addresses via interface 302B. In some embodiments, prefetch engine 310 is further configured to receive acknowledgements 238 from MMU 130 when translations become available for use (i.e., have been prefetched), and to send corresponding notifications 312 to DMA engine 320. In some embodiments, prefetch engine 310 is configured to coordinate when it sends prefetch requests 232 based on the memory requests being sent by DMA engine 320. In the illustrated embodiment, prefetch engine 310 sends a new prefetch request 232 (or set of prefetch requests 232) after receiving an indication 322 that DMA engine 320 has completed issuing memory requests for a particular page (or set of pages).

DMA engine 320, in one embodiment, is configured to facilitate issuing memory requests via interface 302C for prefetched request stream 242. (In some embodiments, DMA engine 320 may also facilitate issuing requests via interface 302A for non-prefetched request stream 212.) As noted above, in various embodiments, DMA engine 320 is configured to coordinate the issuing of memory requests based on indications 312 so that it does not issue memory requests for translations that have yet to be prefetched. DMA engine 320 may also notify prefetch engine 310 (e.g., via a notification 322) of when it should begin sending another set of prefetch requests 232.

Figure 4:
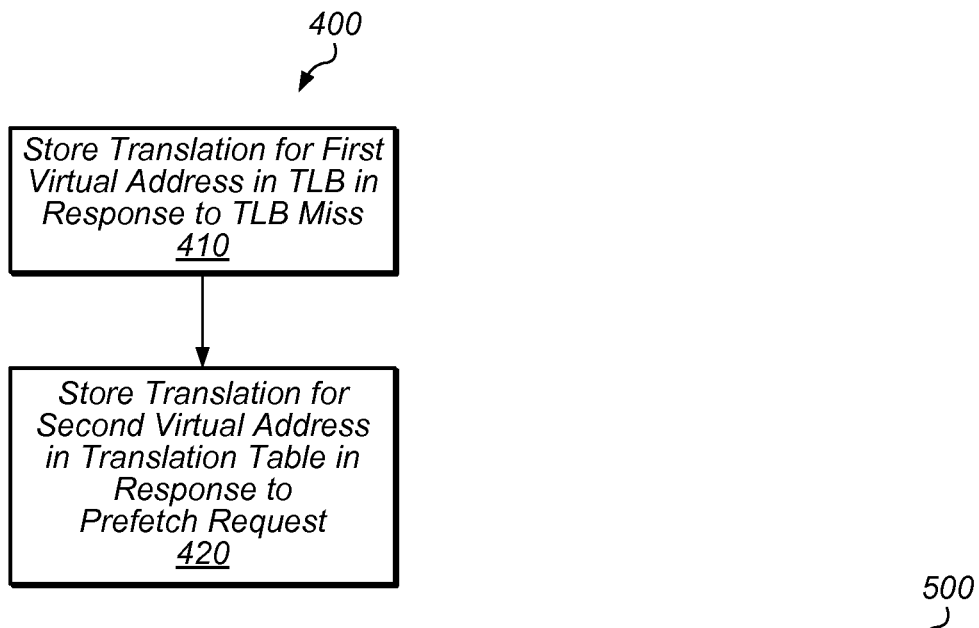
FIG. 4 is a flow diagram illustrating one embodiment of a method performed by the memory management unit.

Turning now to FIG. 4, a flow diagram of a method 400 for storing virtual address translations is depicted. Method 400 is one embodiment of a method that may be performed by a memory management unit such as MMU 130. In various embodiments, performance of method 400 may reduce the possibility of TLB thrashing and improve memory access latencies. In some embodiments, steps 410 and 420 may be repeated, performed in a different order than shown, and/or performed in parallel.

In step 410, a memory management unit stores a translation for a first virtual address in a first translation table (e.g., TLB 210) in response to determining that a memory request specifying the first virtual address has missed the first translation table, such as described above.

In step 420, a memory management unit stores a translation for a second virtual address in a second translation table (e.g., translation table 240) in response to receiving a request (e.g., a request 232) to prefetch a translation for the second virtual address. In one embodiment, the memory management uses the same table walk circuitry to retrieve translations for the first and second translations; however, in one embodiment, step 420 does not include updating the translation lookaside buffer with the translation for the second virtual address. In one embodiment, the memory management unit receives the request to prefetch a translation from a client circuit (e.g., one of clients 120), and the memory management unit sends, to the client circuit, an indication (e.g., acknowledgement 238) specifying that the translation for the second virtual address has been loaded into the second translation table.

Figure 5:
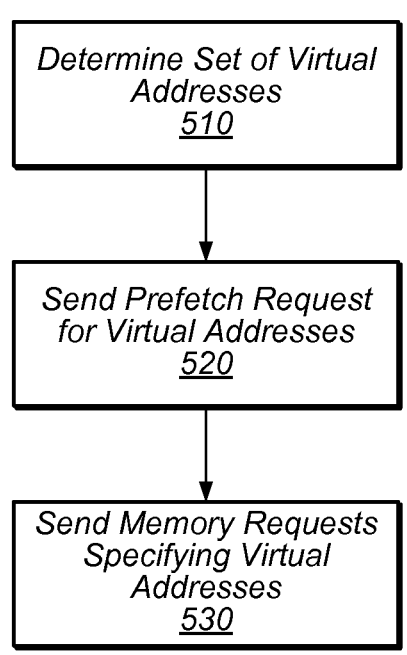
FIG. 5 is a flow diagram illustrating one embodiment of a method performed by the client.

Turning now to FIG. 5, a flow diagram of a method 500 for accessing memory is depicted. Method 500 is one embodiment of a method that may be performed by a client circuit such as one of clients 120. In various embodiments, performance of method 500 may improve memory access latencies for the client circuit.

In step 510, a client determines a set of virtual addresses to be specified in memory requests (e.g., in prefetched request stream 242) of the client. In some embodiments, the client may determine this set based on the particular operations being performed by the client, virtual addresses specified in previously issued memory requests, etc.

In step 520, the client sends one or more prefetch requests (e.g., requests 232) to a memory management unit to cause the memory management unit to load translations for the set of virtual addresses into a translation table (e.g., table 240). In various embodiments, the memory management unit uses table walk circuit (e.g., table walk unit 220) shared between the translation table and a translation lookaside buffer (e.g., TLB 210) to retrieve the translations. In some embodiments, the table walk circuitry retrieves translations for prefetch requests prior to retrieving translations for memory requests that missed the translation lookaside buffer.

In step 530, the client sends, to the memory management unit, one or more memory requests specifying one or more of the set of virtual addresses. In various embodiments, the client sends the one or more memory requests in response to receiving an indication (e.g., ACK 238) that the translations have been loaded into the translation table.

Exemplary Computer System

Figure 6:
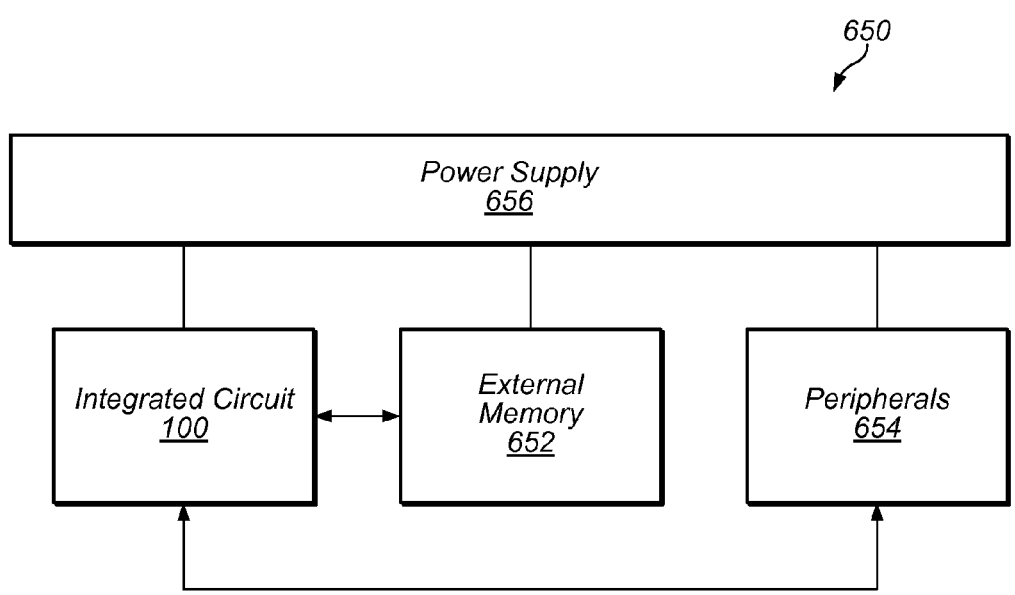
FIG. 6 is a block diagram illustrating one embodiment of an exemplary computer system.

Turning next to FIG. 6 a block diagram of one embodiment of a system 650 shown. In the illustrated embodiment, the system 650 includes at least one instance of an integrated circuit 100 coupled to an external memory 652. The external memory 652 may form the main memory subsystem discussed above with regard to FIG. 1 (e.g. the external memory 652 may include memory 160). The integrated circuit 100 is coupled to one or more peripherals 654 and the external memory 652. A power supply 656 is also provided which supplies the supply voltages to the integrated circuit 100 as well as one or more supply voltages to the memory 652 and/or the peripherals 654. In some embodiments, more than one instance of the integrated circuit 100 may be included (and more than one external memory 652 may be included as well).

The memory 652 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 10 in a chip-on-chip configuration, a package-on-package configuration, or a multi-chip module configuration.

The peripherals 654 may include any desired circuitry, depending on the type of system 650. For example, in one embodiment, the system 650 may be a mobile device (e.g. personal digital assistant (PDA), smart phone, etc.) and the peripherals 654 may include devices for various types of wireless communication, such as WiFi, Bluetooth, cellular, global positioning system, etc. The peripherals 654 may also include additional storage, including RAM storage, solid state storage, or disk storage. The peripherals 654 may include user interface devices such as a display screen, including touch display screens or multitouch display screens, keyboard or other input devices, microphones, speakers, etc. In other embodiments, the system 650 may be any type of computing system (e.g. desktop personal computer, laptop, workstation, net top etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
    a translation lookaside buffer (TLB) configured to store non-prefetched translations;
    a translation table configured to store prefetched translations;
    a prefetch processing unit configured to receive a request specifying a plurality of translations to the prefetched; and
    table walk circuitry shared by the TLB and the translation table, wherein the table walk circuitry is configured to:
        in response to the request, store the plurality of translations in the translation table without updating the TLB.

2. The integrated circuit of claim 1, wherein the TLB and translation table are within a memory management unit configured to process memory requests received via a plurality of direct memory access (DMA) channels, and wherein the memory management unit is configured to receive requests to prefetch translations via ones of the plurality of DMA channels.

3. The integrated circuit of claim 1, wherein the prefetch processing unit is configured to receive prefetch requests from a plurality of client circuits, and wherein the prefetch processing unit is configured to cause the table walk circuitry to fetch translations corresponding to the prefetch requests.

4. The integrated circuit of claim 3, wherein the prefetch processing unit is further configured to:
    receive a prefetch request that specifies a base address of an initial page and a number indicative of a set of pages after the initial page; and
    cause the table walk circuitry to fetch translations for the initial page and the set of pages after the initial page.

5. An integrated circuit, comprising:
    a client circuit configured to:
        determine a plurality of virtual addresses to be specified in a prefetch request of the client circuit;
        send the prefetch requests to a prefetch processing unit in a memory management unit to cause table walk circuitry in the memory management unit to load translations for the plurality of virtual addresses into a translation table distinct from a translation lookaside buffer (TLB) of the memory management unit, wherein the table walk circuitry is configured to load the translations into the translation table without loading the translations into the TLB; and
        send, to the memory management unit, one or more memory requests specifying one or more of the plurality of virtual addresses.

6. The integrated circuit of claim 5, wherein the client circuit is configured to send the one or more memory requests in response to receiving an indication that the translations have been loaded into the translation table.

7. The integrated circuit of claim 5, wherein the client circuit is further configured to send a memory request specifying a virtual address that does not have a prefetched translation, and wherein the memory management unit is configured to store, in response to the memory request, a translation for the virtual address in the TLB.

8. The integrated circuit of claim 5, wherein the client circuit includes:
    a first interface configured to send the one or more memory specifying one or more of the plurality of virtual addresses; and
    a second interface configured to send the memory request specifying a virtual address that does not have a prefetched translation, wherein the second interface is distinct from the first interface.

9. The integrated circuit of claim 5, further comprising:
    one or more additional client circuits configured to send prefetch requests to the memory management unit to cause the memory management unit to load translations into translation table.

10. A method, comprising:
    a memory management unit storing a translation for a first virtual address in a first translation table in response to determining that a memory request specifying the first virtual address has missed the first translation table;
    a prefetch processing unit of the memory management unit receiving a prefetch request to prefetch translations for a plurality of virtual address; and in response to the prefetch request, the memory management unit storing a translation for the plurality of virtual addresses in a second translation table, wherein the second translation table is distinct from the first translation table, and wherein the memory management unit stores the translations for the plurality of virtual addresses in the second translation table without storing the translations for the plurality of virtual addresses in the first translation table.

11. The method of claim 10, wherein the prefetch processing unit receives the prefetch request from a client circuit, and wherein the method further comprises:
the memory management unit sending, to the client circuit, an indication specifying that the translations have been loaded into the second translation table.

12. The method of claim 10, further comprising:
the prefetch processing unit receiving prefetch requests via a plurality of direct memory access (DMA) channels including a first DMA channel and a second DMA channel; and
the memory management unit storing translations in the second translation table such that translations for prefetch requests received via the first DMA channel are stored in a first portion of the second translation table and translations for prefetch requests received via the second DMA channel are stored in a second portion of the second translation table.

13. The method of claim 10, further comprising:
the prefetch processing unit receiving prefetch requests from a plurality of client circuits; and
the memory management unit storing translations for the prefetch requests in the second translation table.

14. The method of claim 10, further comprising:
the memory management unit using the same table walk circuitry to retrieve the translations for the first virtual address and the plurality of virtual addresses from memory.

15. A method, comprising:
a client circuit sending a first memory request to a memory management unit, wherein the memory management unit uses a translation lookaside buffer (TLB) to translate a first virtual address specified by the first memory request; the client circuit sending a second memory request to the memory management unit, wherein the memory management unit uses a translation table configured to store prefetched translations to translate a second virtual address specified by the second memory request, wherein the prefetched translations are stored in the translation table without modifying entries in the TLB; and
prior to sending the second memory request, the client circuit sending, to a prefetch processing unit in the memory management unit, a prefetch request that causes table walk circuitry in the memory management unit to store a plurality of translations in the translation table, wherein the plurality of translations includes a translation for the second virtual address.

16. The method of claim 15, further comprising:
the client circuit receiving an acknowledgement that the memory management unit has stored the plurality of translations in the translation table; and
the client circuit waiting until the acknowledgment has been received before sending the second memory request.

17. The method of claim 15, further comprising:
the client circuit determining a set of virtual addresses to be specified in memory requests of the client circuit; and
the client circuit sending the prefetch request based on the determining.

18. The method of claim 15, wherein the client circuit uses separate direct memory access (DMA) channels to send the first and second memory requests.

19. An integrated circuit, comprising:
a memory management unit configured to:
insert a non-prefetched translation into a translation lookaside buffer (TLB) in response to a memory request for data; and
insert a plurality of prefetched translations into a translation table in response to a request to prefetch the plurality of translations, wherein the memory management unit is configured to receive the request at a prefetch processing unit in the memory management unit, and wherein the plurality of prefetched translations is inserted into the translations table without being inserted into the TLB; and
wherein the translation table is separate from the TLB.

20. The integrated circuit of claim 19, wherein the memory management unit includes table walk circuitry configured to retrieve the non-prefetched translation and the plurality of prefetched translations from memory.

21. The integrated circuit of claim 20, wherein the table walk circuitry is configured to retrieve translations for prefetch requests prior to retrieving translations for memory requests that missed the TLB.

22. The integrated circuit of claim 20, wherein the memory management unit is configured to cause the table walk circuitry to fetch translations associated with a plurality of pages in response to receiving a single prefetch request.

23. The integrated circuit of claim 19, wherein the TLB includes a plurality of levels each configured to store a respective portion of a given translation, where the translation table includes a single level configured to store an entire translation.

* * * * *